US005700409A

United States Patent [19]

Corry

[11] Patent Number: 5,700,409

[45] Date of Patent: Dec. 23, 1997

[54] METHOD OF MOLDING AN ARTICLE

[76] Inventor: Arthur A. Corry, 6832 Trail Blvd., Naples, Fla. 34108

[21] Appl. No.: 748,397

[22] Filed: Nov. 13, 1996

[51] Int. Cl.$^6$ .................... B28B 1/26; C04B 33/28

[52] U.S. Cl. .................... 264/87; 264/86; 264/651; 425/85

[58] Field of Search .................... 264/87, 651, 86; 425/85

[56] References Cited

U.S. PATENT DOCUMENTS

| | | | |
|---|---|---|---|
| 4,401,613 | 8/1983 | Abell | 264/86 |
| 4,935,178 | 6/1990 | Esposito | 264/87 |
| 5,271,888 | 12/1993 | Sinsley | 264/87 |
| 5,427,722 | 6/1995 | Fouts | 264/87 |

*Primary Examiner*—James Derrington
*Attorney, Agent, or Firm*—Merrill N. Johnson

[57] ABSTRACT

A method of molding at article capable of enduring temperatures of at least 1250° F. without deformation or deterioration. High temperature resistant fibers cut to a length of one eighth of an inch are mixed with water to create a pool of slurry. A flexible mold having an article-forming cavity affixed to a suction chamber having means for injecting slurry into the cavity and means for the flow of liquid out of the cavity when the flexible mold and the suction chamber are under vacuum to create within the mold cavity an article of compacted high temperature resistant fibers. The mold is flexed causing the molded article to be released from the cavity within the mold.

4 Claims, 3 Drawing Sheets

METHOD OF MOLDING AN ARTICLE

FIELD OF INVENTION

My invention lies in the field of vacuum forming an article made of high temperature fibers and more particularly vacuum molding an article capable of enduring temperatures of 1250° F.

BACKGROUND OF THE INVENTION

Vacuum forming of boards, sleeves and cups is a well known process in which a slurry of fibers, for example wood pulp, is sucked into an open mold under vacuum. The liquid component of the slurry, usually water, is then squeezed out of the mold in order to form the article within the mold.

High temperature fibers capable of withstanding temperatures exceeding 1250° F. without decomposition are also well known. High temperature fibers are manufactured by several companies under such trade names as Rockwool™, Ceramic and Saffil™. However, insofar as I am aware, there is no publicly known method of vacuum injection molding articles made of high temperature fibers.

SUMMARY OF THE INVENTION

I have invented a unique method of molding an article capable of enduring temperatures of at least 1250° F. without deformation or decomposition and a method of forming a flexible mold used in my method of molding an article. Briefly put, my invention requires that the fibers chosen for use in my process be cut into fibers which are no longer than one eighth of an inch. The cut fibers are then thoroughly mixed with a liquid, usually water and a thickening agent, preferably using high speed mixers operating at 800 to 1250 r.p.m. in a 500 gallon tank, to create a pool of creamy slurry within the tank. If the resulting article is to have a particular color, that color can be added to the slurry as it is being mixed.

A mold having a cavity with an outer contour which is a reverse image of the article to be molded is attached to a suction chamber and the two lowered into the pool of slurry where they are placed under vacuum to flow slurry into the mold's cavity.

My process uses a novel flexible mold which is built around an exact model of the article to be molded. The model may or may not be partially encapsulated within a sheet of flexible and liquid impervious material to form within the sheet a reverse image of the outer contour of the article to be made. The model and its partially encapsulating sheet are placed in a generally cubical open topped container preferably with rectangular sides and a flat planar bottom with the bottom surface of the model placed on the bottom of the container. A curable liquid polymer composition is then poured into the container to completely encapsulate the model and its partially encapsulating sheet, if used, within the liquid polymer composition.

A spaced apart pair of handles are inserted into the curable liquid polymer composition on opposite sides of the model within the composition and then the liquid polymer composition is allowed to cure with the pair of handles partially embedded therein. The resulting cured solid flexible mold is then removed from the container. Starting from the center of each of two opposing sides of the flexible mold, a razor-thin vertical slit about one half inch deep running to the bottom edge of the side is cut into the cured flexible polymer material to facilitate removal of the model from the mold. To further facilitate removal of the model and subsequently a molded article, a V-shaped groove may be cut along the centerline of the mold's top surface.

Then by moving the handles toward each other, the mold will flex to open the mold along the centerline of the bottom of the mold and thereby release the model from flexible mold to form a cavity within the flexible mold for forming molded articles as exact replicas of the model.

The flexible mold now has on its bottom surface an opening for the flow of slurry into the mold's cavity designed to mate with a plurality of entry ports and an exit port in a suction chamber when the mold is mated with the suction chamber. The flexible mold preferably sits on a perforated plate on the upper surface of the suction chamber. The perforated plate prevents fibers from leaving the cavity but does not inhibit the discharge of liquid from within the cavity when the mold and suction chamber are under vacuum.

If a portion of the mold cavity contains a much greater volume than the cavity's other portions, to insure complete filling of the mold cavity with compacted fibers, injectors which may extend into the mold cavity can be inserted into one or more of the entry ports of the suction chamber. An injector extending into the mold cavity is affixed to the entry port nearest the portion of the mold cavity having the greatest volume.

The molding process is best done as a three stage program which is preferably programmed onto a panel to provide precise timing of the flow of slurry into the mold cavity and the discharge of liquid from the slurry within the mold cavity. Once the flow of slurry into the mold cavity is stopped, it is not possible to add any additional slurry into the mold cavity and therefore precise timing of the flow into the mold cavity is essential to the manufacture of reliable articles capable of enduring temperatures about 1250° F. without deformation or decomposition.

The creation of vacuum within the suction chamber causes slurry to flow into the mold's cavity and liquid to be sucked out of the fibers within the mold cavity, resulting in the formation of an article of highly compacted high temperature fibers. The vacuum is turned off in air and the flexible mold uncoupled from the suction chamber. The mold containing the molded article is then removed from the suction chamber.

By manual or automated manipulation of the mold's handles, the mold will flex along the centerline of the bottom of the mold thereby opening the flexible mold to allow the molded article to fall out of its cavity. The formed article will have the exact contour and color of the original model.

DETAILED DESCRIPTION OF THE PREFERRED EMBODIMENTS

Figure 1:
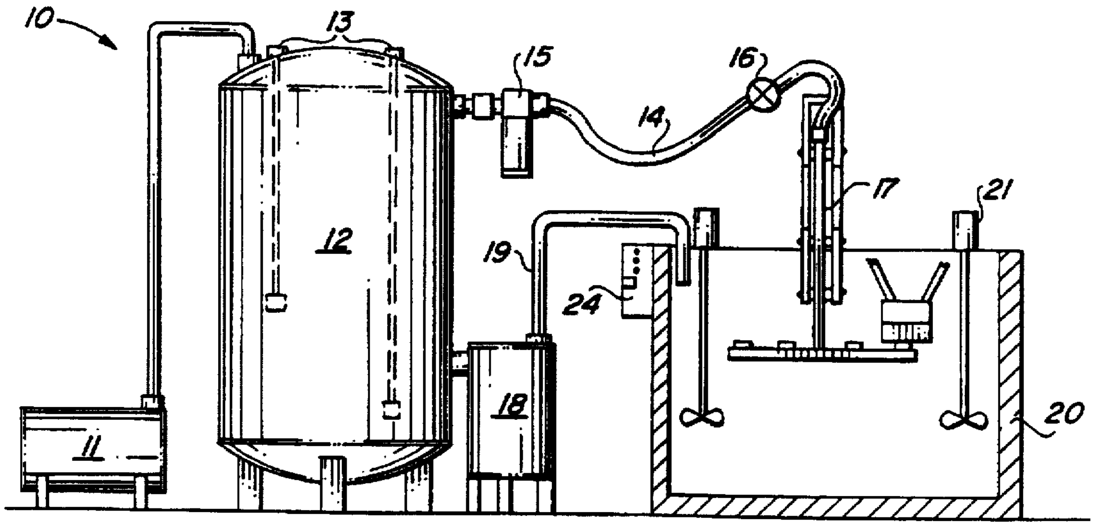
FIG. 1 is a diagrammatic view showing the major components of my injection vacuum molding process.

FIG. 1 of the drawings shows the major components of my unique injection vacuum molding process 10. Vacuum pump 11 is connected to a preferably 1,000 gallon pressure vessel 12 whose pressure and temperature are monitored by a plurality of sensors 13.

Figure 8:
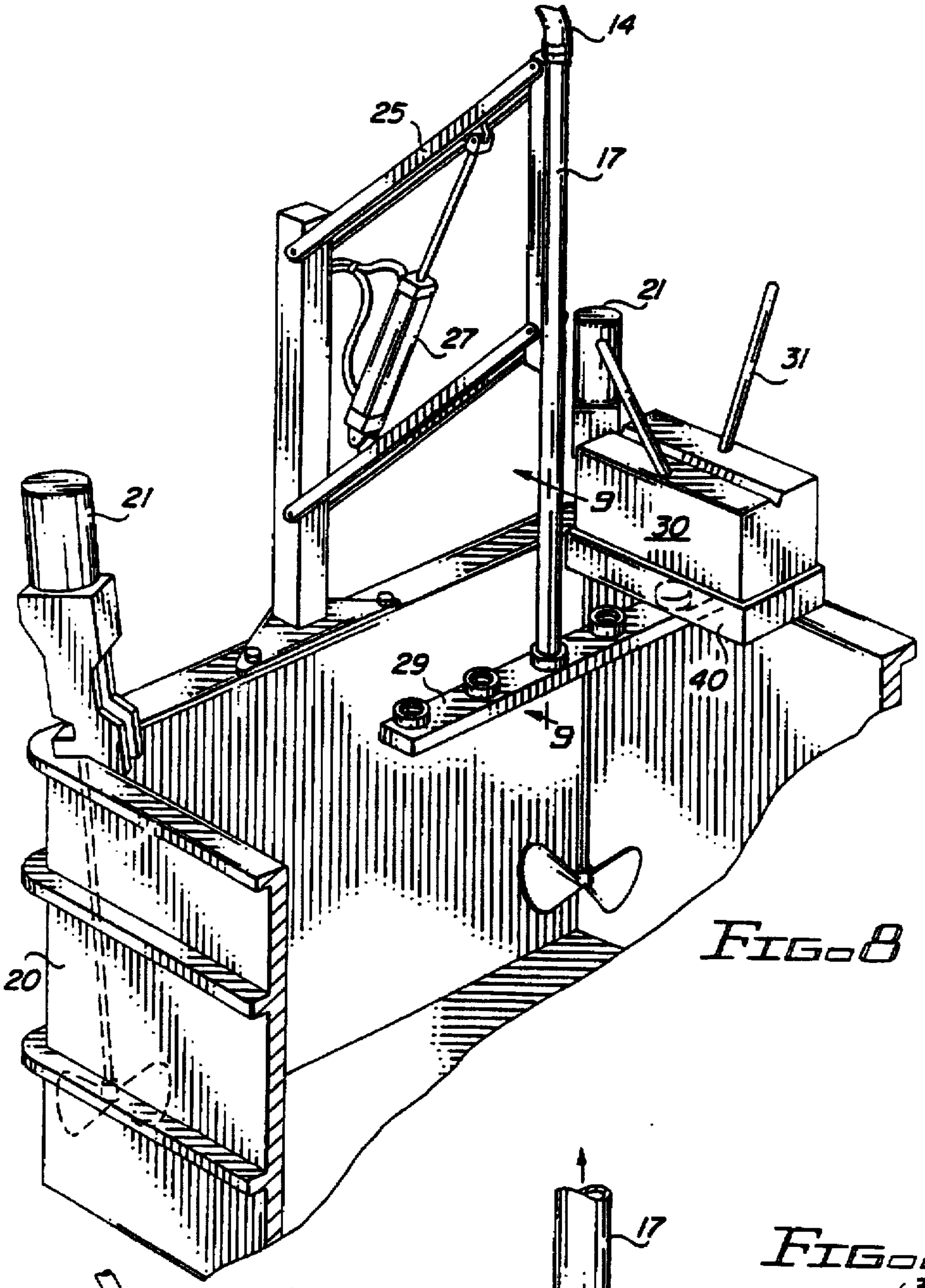
FIG. 8 is a perspective view partially cut away of the slurry mixing tank showing a flexible mold nested in a suction chamber to be lowered into the pool of slurry (not shown) in the tank.
Figure 9:
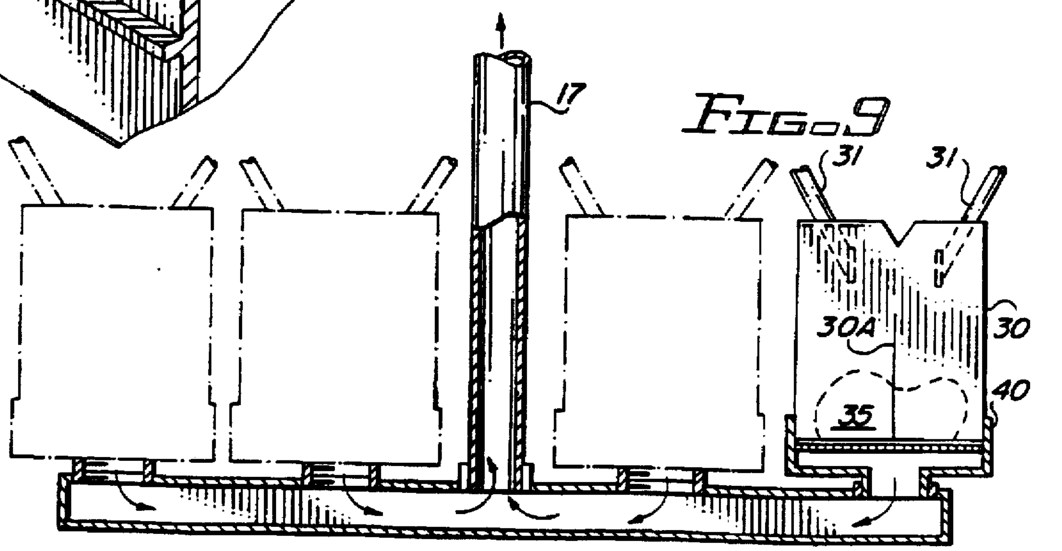
FIG. 9 is a cross-sectional view partially in phantom taken along line 9—9 of FIG. 8 illustrating the suction of the liquid content of the slurry from the mold cavity to create an article of compacted high temperature fibers within the mold cavity.

A pipeline 14 containing a site glass 15 and a gate valve 16 connects pressure vessel 12 to vertical pipe 17 shown in greater detail in FIGS. 8 and 9. Recirculating pump 18 and pipeline 19 return liquid from pressure vessel 12 to mixing tank 20.

Mixing tank 20 preferably having a 500 gallon capacity receives measured quantities of cut high temperature fibers, water and a thickening agent. These ingredients are mixed together into a pool of creamy slurry (not shown) within mixing tank 20 using a plurality of mixers 21 operating at from 800 to 1250 r.p.m. spaced along the rim of mixing tank 20 as shown in FIGS. 1 and 8.

My vacuum molding process utilizes a novel flexible mold 30 best shown in FIGS. 2, 3, 6 and 7. Mold 30 was constructed by first partially encapsulating an exact model of the article to be molded within a sheet-like layer of flexible and liquid impervious material to form within the layer a reverse image of the outer contour of the article to be made.

The model and its partially encapsulating layer are placed in an open topped container having rectangular sides and a flat bottom with the partially encapsulated portion of the layer placed against the bottom of the container. A curable liquid polymer composition is then poured into the container to completely encapsulate the model and its partially encapsulating layer within the liquid polymer composition. The lower portions of a pair of handles 31 are inserted from above into the still liquid polymer on opposite sides of the model within the composition and the pool of polymer composition is allowed to cure until solid. The resulting cured flexible mold 30 is then removed from the container.

Figure 6:
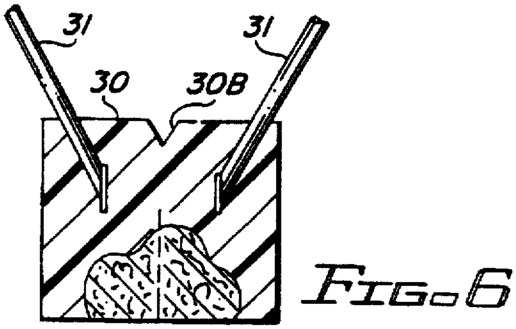
FIG. 6 is a cross-sectional view of the flexible mold taken along line 6—6 of FIG. 2.
Figure 10:
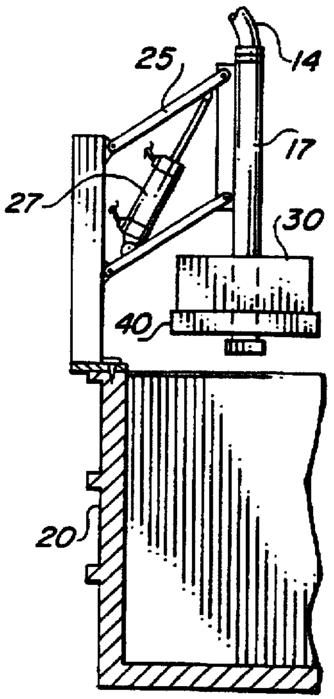
FIG. 10 is a cross-sectional side view partially cut away of the slurry mixing tank and the mechanism for supporting the flexible mold and suction chamber.

Starting from the center of each of two opposite sides of mold 30, a razor-thin vertical slit 30A about one half inch deep running to the bottom of the mold is cut into the flexible cured polymer to facilitate removal of the model from the mold. To also facilitate removal of the model, V-shaped groove 30B may be cut along the centerline of the mold's top surface as illustrated in FIG. 6.

Figure 7:
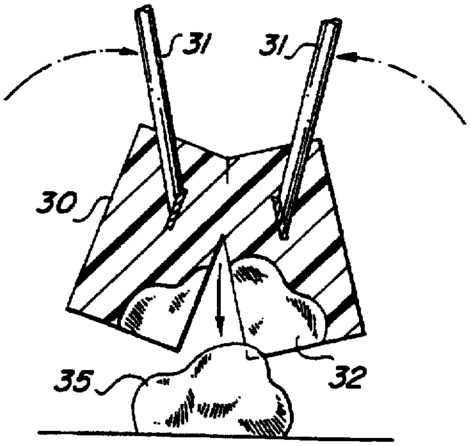
FIG. 7 illustrates the manipulation of the mold's two handles to open the mold and allow the article molded of compacted high temperature fibers to fall out of the mold.

By moving handles 31 toward each other as illustrated in FIG. 7, mold 30 will flex to open the mold along the centerline of the bottom surface of the flexible mold and thus release the model from the mold as shown in FIG. 7, thereby creating within mold 30 a cavity 32 for forming molded articles which are exact replicas of the model.

Figure 2:
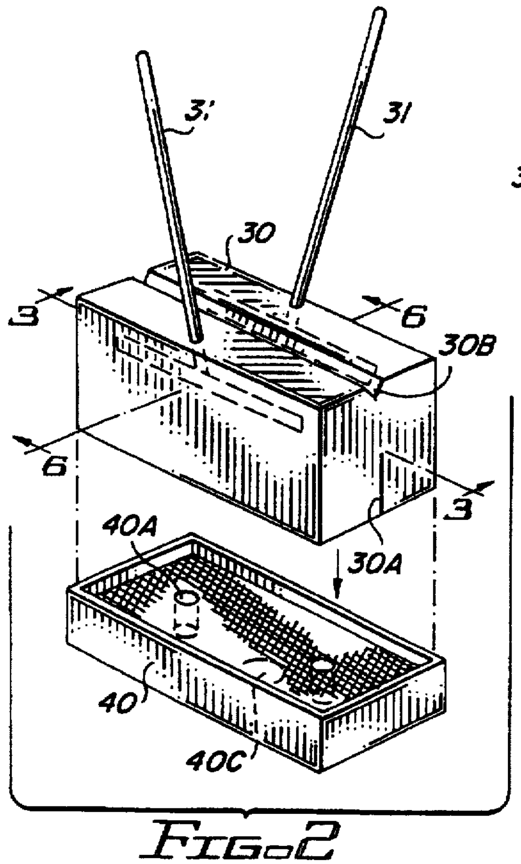
FIG. 2 is a perspective view showing a preferred form of the flexible mold used in my injection vacuum molding process being lowered into a preferred form of my suction chamber.
Figure 4:
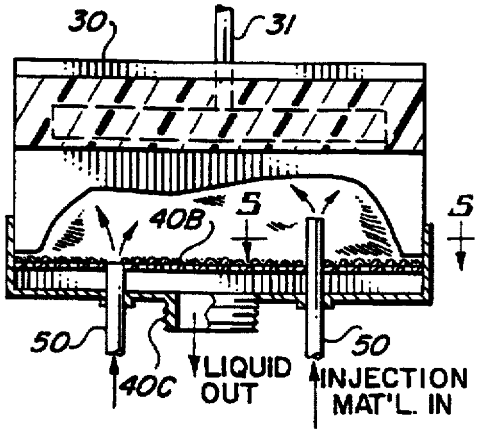
FIG. 4 is a cross-sectional view of a flexible mold nested in a suction chamber showing the use of an injector extending into the mold cavity to insure proper filling of a mold cavity having a portion of the cavity larger than other portions of the cavity.
Figure 5:
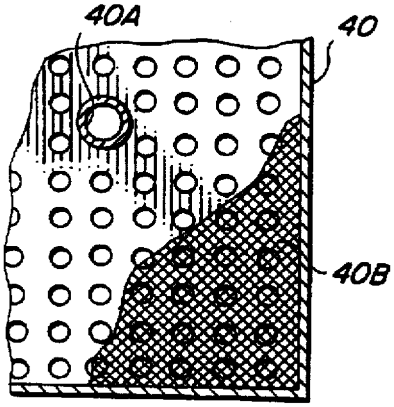
FIG. 5 is a partially cut away plan view of a suction chamber taken along line 5—5 of FIG. 4 showing the chamber's perforated plate.

Flexible mold 30 has an opening along its bottom surface for the flow of slurry into mold cavity 32 which mates with entry ports 40A and exit port 40C of suction chamber 40 when mold 30 is lowered and fitted into the suction chamber as shown in FIGS. 2 and 4. Mold 30 preferably rests on perforated plate 40B located on the upper surface of suction chamber 40. Under vacuum the perforated plate best shown in FIG. 5 prevents cut fibers from leaving the mold cavity 32 but does not inhibit the discharge of liquid from cavity 32.

Figure 3:
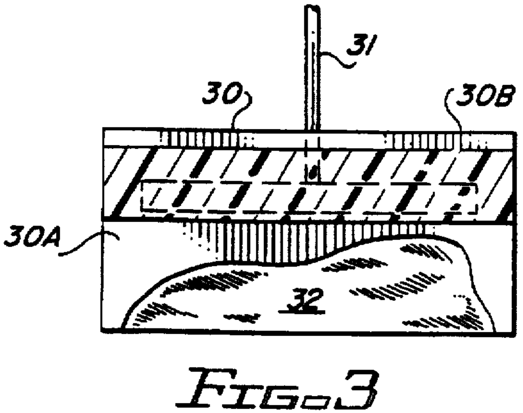
FIG. 3 is cross-sectional view of the flexible mold taken along line 3—3 of FIG. 2 showing a handle embedded into the mold.

In the event that one end of mold cavity 32 has a much greater volume than its other end as shown in FIGS. 3 and 4, to insure proper filling of the cavity, a hollow cylindrical injector 50 whose upper end extends into the mold cavity is fixed within an adjacent suction chamber entry port 40A as shown in FIG. 4.

My vacuum molding process requires precise timing of the period during which the slurry containing cut high temperature fibers is sucked into mold cavity 32. Hence the steps of the process are best controlled by buttons on a panel 24 as shown in FIG. 1.

Figure 11:
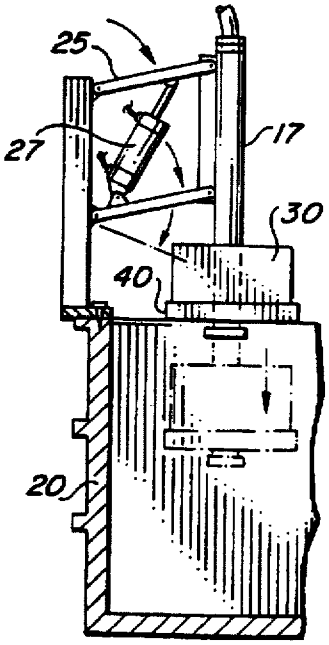
FIG. 11 is a cross-section side view similar to FIG. 10 which shows the movement of the mechanism for lowering the mold and suction chamber into the pool of slurry.

FIGS. 8, 9, 10 and 11 illustrate a preferred arrangement of equipment used in my vacuum molding process. FIG. 8 includes a cut-away view of tank 20 supporting two high speed mixers 21. Tank 20 also supports mechanism 25 including hydraulic cylinder 27 which when activated lowers four flexible molds 30 and their supporting suction chambers 40 into the pool of slurry as shown in FIG. 11.

The four molds and suction chambers are mounted side by side on a hollow bar 19 attached to hollow vertical pipe 17 as shown in FIG. 9. When mechanism 25 lowers the molds and suction chambers into the pool of slurry and then vacuum is turned on, slurry is sucked up through entry ports 40A (and injectors 50, when used) and into mold cavity 32. Almost instantaneously the liquid content of the slurry in the mold cavity will begin to be sucked or drawn out of the cavity, through bar 19, up pipe 17, through pipeline 14 and into pressure vessel 12.

Then at the termination of the flow of slurry into mold cavities 32, the mechanism is activated to raise the molds and suction chambers up and out of the pool of slurry where the vacuum is turned off. The four molds 30 are then removed from their suction chambers and by moving handles 31 toward each other as shown in FIG. 7, flexible mold 30 will flex to open the mold along the line of the opening in its bottom surface thereby releasing the molded article 35 and allowing it to fall out of mold cavity 32.

Article 35 is then washed and allowed to dry, producing an exact replica of the model which is capable of withstanding temperatures of 1250° F. without deformation or decomposition.

While having illustrated and described preferred forms of my vacuum molding process and unique flexible mold, such disclosure in no way defines the limits of my invention whose scope is defined only by the appended claims.

I claim:

1. A method of molding an article capable of enduring temperatures of at least 1250° F. without deformation or deterioration composed of a compact mixture of fibers capable of enduring temperatures of at least 1250° F. comprising cutting the fibers into lengths of not more than one eighth of an inch;

rapidly mixing the cut fibers with a liquid to form a pool of slurry;

providing a flexible mold having a flat planar bottom with an article-forming cavity opening along the bottom of the flexible mold;

providing a suction chamber having a plurality of entry ports for the flow of slurry into the mold cavity, an exit port for the flow of water from the slurry within the cavity and a perforated plate which prevents the flow of fibers from the cavity;

coupling the flexible mold to the suction chamber so that the article-forming cavity will receive slurry from the chamber's entry ports and expel water through the exit port;

submersing the suction chamber and flexible mold into the pool of slurry;

creating a vacuum within the suction chamber to cause slurry to flow into the article-forming cavity and expel water from the cavity thereby to form within the cavity an article of tightly compacted fibers;

removing the suction chamber and flexible mold from the pool of slurry;

uncoupling the mold from the suction chamber; and flexing the flexible mold to cause the molded article to drop out of the bottom of the mold.

2. A method of molding an article as set forth in claim 1 in which the cut fibers are rapidly mixed with water and a thickening agent to create a pool of creamy slurry.

3. A method of molding an article as set forth in claim 1 in which the number of entryports in the suction chamber is two which lie on opposite sides of the exit port.

4. A method of molding an article as set forth in claim 1 in which a hollow cylindrical injector is fixed within one of the entry ports in the suction chamber with its upper end extending into the flexible mold's article-forming cavity.

* * * * *